United States Patent
Itoh et al.

(10) Patent No.: US 10,308,442 B2
(45) Date of Patent: Jun. 4, 2019

(54) CONVEYED-OBJECT DISCHARGE DEVICE

(71) Applicant: ITOH DENKI CO., LTD., Kasai-shi, Hyogo (JP)

(72) Inventors: Kazuo Itoh, Kasai (JP); Tatsuhiko Nakamura, Hyogo (JP); Makoto Mitsuyoshi, Kakogawa (JP)

(73) Assignee: Itoh Denki Co., Ltd. (JP)

( * ) Notice: Subject to any disclaimer, the term of this patent is extended or adjusted under 35 U.S.C. 154(b) by 0 days.

(21) Appl. No.: 15/120,386

(22) PCT Filed: Feb. 24, 2015

(86) PCT No.: PCT/JP2015/055232
§ 371 (c)(1),
(2) Date: Jan. 19, 2017

(87) PCT Pub. No.: WO2015/129688
PCT Pub. Date: Sep. 3, 2015

(65) Prior Publication Data
US 2017/0129714 A1    May 11, 2017

(30) Foreign Application Priority Data
Feb. 28, 2014 (JP) .................................. 2014-039734

(51) Int. Cl.
*B65G 13/07* (2006.01)
*B65G 13/10* (2006.01)
(Continued)

(52) U.S. Cl.
CPC ............ *B65G 47/54* (2013.01); *B65G 13/07* (2013.01); *B65G 13/10* (2013.01); *B65G 23/08* (2013.01)

(58) Field of Classification Search
CPC ................................. B65G 47/54; B65G 13/10
(Continued)

(56) References Cited

U.S. PATENT DOCUMENTS 3,456,773 A * 7/1969 Titmas, Jr. ............. B65G 47/24
198/370.09
3,983,988 A * 10/1976 Maxted .................. B65G 47/54
193/36
(Continued)

FOREIGN PATENT DOCUMENTS

EP      0244805 A2   11/1987
JP      58-183520    10/1983
(Continued)

OTHER PUBLICATIONS

International Preliminary Report on Patentability, dated Sep. 6, 2016, in Appln. No. PCT/JP2015/055232.
(Continued)

*Primary Examiner* — William R Harp
(74) *Attorney, Agent, or Firm* — Wood, Phillips, Katz, Clark & Mortimer

(57) ABSTRACT

A discharge device is constructed so that, when conveyance destinations for a preceding conveyed object and a closely spaced succeeding conveyed object are different, the objects can be conveyed without stopping the conveyance of the succeeding conveyed object. The device has: a) discharge members that extend and retract between a plurality of conveying bodies in a main conveying conveyor, come into contact with a conveyed object when the discharge members extend between the conveying bodies, and impart a conveying force to the conveyed object, the force being in a direction different from that of the conveying bodies; b) a base member that supports the discharge members; and c) a and base swinging unit that swings the base member. By swinging the base member, it is possible to make the discharge members on the upstream side and the downstream side in the conveyance direction individually extend and retract between the conveying bodies.

9 Claims, 13 Drawing Sheets

(51) Int. Cl.
*B65G 23/08* (2006.01)
*B65G 47/54* (2006.01)

(58) Field of Classification Search
USPC .................. 198/370.05, 370.09, 457.02, 598
See application file for complete search history.

(56) References Cited

U.S. PATENT DOCUMENTS

| | | | | |
|---|---|---|---|---|
| 5,007,521 | A * | 4/1991 | Tanaka | B65G 1/1378 198/347.1 |
| 5,029,693 | A * | 7/1991 | Williams | B65G 13/10 198/367 |
| 5,971,133 | A * | 10/1999 | Wilkins | B65G 47/54 198/370.09 |
| 6,360,869 | B1 * | 3/2002 | Itoh | B65G 23/08 198/370.1 |
| 7,581,632 | B2 * | 9/2009 | Wallace | B65G 13/10 198/370.08 |
| 2007/0284218 | A1 | 12/2007 | Wallace et al. | |
| 2009/0294253 | A1 | 12/2009 | Eisenberg et al. | |
| 2012/0048678 | A1 * | 3/2012 | Itoh | B65G 13/075 198/577 |

FOREIGN PATENT DOCUMENTS

| | | |
|---|---|---|
| JP | 3-118911 U | 12/1991 |
| JP | 08277025 A * | 10/1996 |
| JP | 08282835 A | 10/1996 |
| JP | 2000-309413 A | 11/2000 |
| JP | 2001-192116 A | 7/2001 |
| JP | 2005-280868 A | 10/2005 |
| JP | 2009-203013 A | 9/2009 |
| JP | 2009-539729 | 11/2009 |
| WO | WO-2007/146522 A1 | 12/2007 |

OTHER PUBLICATIONS

Supplementary European Search Report, dated Oct. 6, 2017 in European Patent Application No. EP 15 75 6034.

* cited by examiner

CONVEYED-OBJECT DISCHARGE DEVICE

TECHNICAL FIELD

The present invention relates to a conveyed-object discharge device that discharges a conveyed object from the conveyor line of a conveying apparatus.

BACKGROUND ART

In product assembling lines and conveyed-object delivery centers, conveyor lines are often used for conveying conveyed objects. For example, in the delivery centers, a large number of conveyor lines are crisscrossing, and conveyed-object discharge devices are disposed in the positions where the conveyor lines cross each other. That is, each conveyed-object discharge device has the function of moving a conveyed object from a conveyor line to another conveyor line branched therefrom. In addition, the conveyed-object discharge device can move a conveyed object to a conveyed place located laterally on a main conveyor line.

The conveyed-object discharge device has discharge mechanisms that extend and retract from the conveying plane of a conveyor line. When a conveyed object is discharged laterally from the conveyor line, the discharge mechanisms extend to discharge the conveyed object. When a conveyed object is not discharged laterally from the conveyor line, the discharge mechanisms retract from the conveying plane so that the conveyed object does not come into contact with the discharge mechanisms.

In many cases, each of conveyed objects continuously conveyed is discharged laterally from a conveyor line or travels along the conveyor line without being discharged laterally. Thus, the conveyor line is provided with a sensor that identifies the conveyance destination for each conveyed object, the sensor identifying whether the conveyed object is discharged laterally from the conveyor line.

When a preceding conveyed object is discharged laterally from a conveyor line and a succeeding conveyed object is directly conveyed along the conveyor line without being discharged from the conveyor line, the discharge mechanisms extend from the conveying plane to receive the preceding conveyed object. Then, the preceding conveyed object is discharged laterally from the conveyor line by the discharge mechanisms. In that case, the succeeding conveyed object is stopped on the upstream side of the discharge mechanisms. Thereafter, when the preceding conveyed object is discharged laterally from the conveyor line by the discharge mechanisms, the discharge mechanisms are lowered from the conveying plane to restart the conveyance of the succeeding conveyed object. The succeeding conveyed object is directly conveyed along the conveyor line without coming into contact with the discharge mechanisms.

When the preceding conveyed object is directly conveyed along the conveyor line without being discharged laterally from the conveyor line and the succeeding conveyed object is discharged laterally from the conveyor line, the discharge mechanisms retract downwardly of the conveying plane to move the preceding conveyed object along the conveyor line, and while the preceding conveyed object is passed through the discharge mechanism disposed position, the succeeding conveyed object is stopped on the upstream side of the discharge mechanisms. Then, when the preceding conveyed object is moved to the downstream side of the discharge mechanism disposed position, the discharge mechanisms extend from the conveying plane to restart the conveyance of the succeeding conveyed object. The succeeding conveyed object is discharged laterally by the discharge mechanisms.

Here, to efficiently convey the conveyed objects by the conveyor line, the space between the conveyed objects is preferably minimized to continuously convey the conveyed objects. However, in the conventional conveying apparatus, when the conveyance destinations for the preceding conveyed object and the succeeding conveyed object are different, the conveyance of the succeeding conveyed object is required to be temporarily stopped, as described above, resulting in the immediate conveyance of the conveyed objects being inhibited.

A direction changing device that can solve such problems is disclosed in Patent Document 1. In the direction changing device disclosed in Patent Document 1, a plurality of direction changing units are disposed side by side in the conveyance direction of a conveyor line. The direction changing units have direction changing rollers, driving mechanisms that rotationally drive the direction changing rollers, and raising and lowering mechanisms that raise and lower the direction changing rollers. The direction changing rollers, with the raising and lowering mechanisms, extend and lower from the conveying plane of the conveyor line on which a conveyed object is placed, and are rotationally driven by the driving mechanisms.

When the direction changing rollers of the direction changing units extend from the conveying plane and are rotationally driven, the conveyed object on the conveyor line is moved onto the direction changing rollers, and is discharged laterally from the conveyor line by the rotating direction changing rollers. In addition, when the direction changing rollers retract from the conveying plane, the conveyed object is conveyed along the conveyor line without being influenced by the direction changing rollers.

Here, when a preceding conveyed object is discharged laterally from the conveyor line, and a succeeding conveyed object is not discharged from the conveyor line but is directly conveyed along the conveyor line, the direction changing rollers of the direction changing units extend from the conveying plane, thereby discharging the preceding conveyed object from the conveyor line. The preceding conveyed object is guided by the direction changing rollers of the direction changing units to change the conveyance direction, and is discharged laterally from the conveyor line while being moved from the direction changing units disposed on the upstream side to the direction changing units disposed on the downstream side.

That is, when the preceding conveyed object is moved to the direction changing units on the downstream side, the preceding conveyed object is not on the direction changing units on the upstream side. Thus, even when the direction changing rollers of the direction changing units on the upstream side retract from the conveying plane, this is not troublesome in the discharge of the preceding conveyed object from the conveyor line. Thus, while the preceding conveyed object is discharged from the conveyor line by the direction changing units on the downstream side, the direction changing units on the upstream side retract from the conveying plane. However, the succeeding conveyed object is not influenced by the direction changing units on the upstream side, so that the conveyance is not required to be stopped.

In addition, when the preceding conveyed object is directly conveyed along the conveyor line other than being discharged from the conveyor line and the succeeding conveyed object is discharged laterally from the conveyor line, the preceding conveyed object is passed through the direction changing rollers of the direction changing units retracting from the conveying plane. After the preceding conveyed object has passed through the direction changing units disposed on the upstream side, only the direction changing rollers of the direction changing units through which the preceding conveyed object has passed extend from the conveying plane. The preceding conveyed object is directly moved to the downstream side without being influenced by the direction changing units on the upstream side.

Then, the succeeding conveyed object is guided by the direction changing rollers of the direction changing units on the upstream side to start to change the conveyance direction. At this time, since the preceding conveyed object has passed through the direction changing units on the downstream side along the conveyor line, the direction changing rollers of the direction changing units on the downstream side extend from the conveying plane. The succeeding conveyed object is guided by the direction changing rollers on the downstream side following the direction changing units on the upstream side, and is discharged from the conveyor line.

In the direction changing device in Patent Document 1, the plurality of conveyed objects can be continuously immediately conveyed along the conveyor line and discharged from the conveyor line without being required to temporarily stop the conveyance of the succeeding conveyed object.

PRIOR ART DOCUMENTS

Patent Documents

Patent Document 1: JP 2005-280868 A

DISCLOSURE OF INVENTION

Technical Problem

The direction changing device disclosed in Patent Document 1 has a large number of components and is complicated in configuration, and further requires very precise control during use. That is, the direction changing units are required to be individually operated according to the conveyance destinations for the conveyed objects continuously conveyed and the position on the conveyor line in the region from the upstream side to the downstream side, thus complicating the control of the direction changing units.

Accordingly, an object of the present invention is to provide a conveyed-object discharge device that has a simpler configuration and that, when the conveyance destinations for a preceding conveyed object and a succeeding conveyed object are different, can convey the conveyed objects without stopping the conveyance of the succeeding conveyed object and with a small space between the preceding conveyed object and the succeeding conveyed object.

Solution to Problem

To solve the above problems, an aspect of the present invention provides a conveyed-object discharge device for discharging a conveyed object, including:

a main conveying conveyer configuring part of a main conveying passage, the conveyed object being discharged from the main conveying conveyor, the main conveying conveyor including a plurality of conveying bodies, the plurality of conveying bodies coming into contact with the conveyed object to impart a conveying force to the conveyed object, the plurality of conveying bodies being disposed with a predetermined space;

a plurality of discharge members comprising a first group of discharge members disposed in one region and a second group of discharging members disposed in another region, the plurality of discharge members extending and retracting between the plurality of conveying bodies, the plurality of discharge members coming into contact with the conveyed object when the plurality of discharge members extend between the conveying bodies, the plurality of discharge members imparting a conveying force to the conveyed object, the conveying force being in the direction different from that of the conveying bodies;

a base member supporting the plurality of discharge members or the main conveying conveyor; and a posture changing unit changing a posture of the base member, wherein by changing the posture of the base member using the posture changing unit, the conveyed-object discharge device allows to create a state in which the first group of discharge members extend between the conveying bodies and the second group of discharge members retract between the conveying bodies, and a state in which the first group of discharge members retract between the conveying bodies and the second group of discharge members extend between the conveying bodies.

In this aspect, the posture changing unit changes the posture of the base member. In addition, the base member supports the plurality of discharge members or the main conveying conveyor.

For example, the plurality of discharge members in the one region or the other region are lowered by the posture changing unit to retract between the conveying bodies. Alternatively, part of the base member is raised by the posture changing unit to relatively retract the discharge members in the one region or the other region between the conveying bodies.

In addition, the plurality of discharge members are raised in the one region or the other region by the posture changing unit to extend between the conveying bodies. Alternatively, part of the base member is lowered by the posture changing unit to relatively extend the discharge members in the one region or the other region between the conveying bodies.

Desirably, the base member supports the plurality of discharge members.

Desirably, the posture changing unit changes the posture of the base member into the tilted posture.

To solve the above problems, a desirable aspect of the present invention provides a conveyed-object discharge device for discharging a conveyed object, including:

a main conveying conveyer configuring part of a main conveying passage, the conveyed object being discharged from the main conveying conveyor, the main conveying conveyor including a plurality of conveying bodies, the plurality of conveying bodies coming into contact with the conveyed object to impart a conveying force to the conveyed object, the plurality of conveying bodies being disposed with a predetermined space;

a plurality of discharge members comprising a first group of discharge members disposed in one region and a second group of discharging members disposed in another region, the plurality of discharge members extending and retracting between the plurality of conveying bodies, the plurality of discharge members coming into contact with the conveyed object when the plurality of discharge members extend between the conveying bodies, the plurality of discharge members imparting a conveying force to the conveyed object, the conveying force being in the direction different from that of the conveying bodies;

a base member supporting the plurality of discharge members; and a base swinging unit swinging the base member, wherein by swinging the base member, the conveyed-object discharge device allows to create a state in which the first group of discharge members extend between the conveying bodies to come into contact with the conveyed object and the second group of discharge members retract between the conveying bodies, and a state in which the first group of discharge members retract between the conveying bodies and the second group of discharge members extend between the conveying bodies to come into contact with the conveyed object.

In this aspect, by swinging the base member, it is possible to create a state in which the discharge members disposed in one region extend between the conveying bodies to come into contact with the conveyed object and the discharge members disposed in the other region retract between the conveying bodies, and a state in which the discharge members disposed in the one region retract between the conveying bodies and the discharge members disposed in the other region extend between the conveying bodies to come into contact with the conveyed object.

The discharge members in the one region (the region on the upstream side or the region on the downstream side in the conveyance direction of the conveyed object) and the discharge members in the other region (the region on the downstream side or the region on the upstream side in the conveyance direction of the conveyed object) are supported by the base member, and can be operated at the same time simply by swinging the shared base member. That is, by a simple configuration, the raising and lowering of the discharge members in the one region and the lowering and raising of the discharge members in the other region can be carried out at the same time.

Thus, conveyed objects having different conveyance destinations can be passed at the same time through the conveyed-object discharge device.

That is, when a preceding conveyed object is discharged from the main conveying conveyor and a succeeding conveyed object is not discharged from the main conveying conveyor, the preceding conveyed object receives a conveying force from the discharge members in the one region (on the upstream side) extending between the conveying bodies, thereby being moved to the discharge members in the other region (on the downstream side), and then receives a conveying force from the discharge members in the other region (on the downstream side), thereby being discharged from the main conveying conveyor. Here, when the preceding conveyed object is guided by the discharge members in the other region (on the downstream side), the preceding conveyed object which has passed through the discharge members in the one region (on the upstream side) does not come into contact with the discharge members in the one region (on the upstream side).

Thus, even when the discharge members in the one region (on the upstream side) retract between the conveying bodies, this does not influence the conveyance of the preceding conveyed object (the discharge from the main conveying conveyor). Therefore, in the present invention, the base member is swung to retract the discharge members in the one region (on the upstream side) between the conveying bodies so that the succeeding conveyed object cannot come into contact with the discharge members in the one region (on the upstream side).

Thus, even when the conveyance destination for the succeeding conveyed object is different from the conveyance destination for the preceding conveyed object, the conveyance of the succeeding conveyed object is not required to be stopped while the preceding conveyed object passes through the conveyed-object discharge device, and the succeeding conveyed object can be conveyed without increasing the space between the preceding conveyed object and the succeeding conveyed object. As a result, the plurality of conveyed objects can be immediately conveyed.

Desirably, the base swinging unit includes: a first motor and a second motor; and a first conversion unit and a second conversion unit both of which convert the rotational motion of the motors to raising and lowering motion, the first motor and the first conversion unit being disposed on one end side of the base member, the second motor and the second conversion unit being disposed on the other end side of the base member, the ends of the base member being alternately raised and lowered to swing the base member.

In this aspect, one motor and one set of conversion unit are disposed on one end side of the base member, and the other motor and the other set of conversion unit are disposed on the other end side of the base member. The conversion units convert the rotational force of the motors to a force in the reciprocating linear direction.

The one end side and the other end side of the base member are respectively raised and lowered by the motors and the conversion unit, so that the one end side can be raised to lower the other end side, and the one end side can be lowered to raise the other end side. That is, the base member can be swung by alternately raising and lowering the ends of the base member. In addition, according to the driving method of the motors, both ends of the base member can be raised or lowered at the same time.

Thus, the conveyed-object discharge device according to the present invention can swing the base member by a simple configuration.

As the conversion unit, a cam mechanism, a crank mechanism, a link mechanism, a rack and pinion, and a screw can be adopted.

Desirably, the discharge members are short rollers rotated by power, the short rollers being disposed so as to be tilted with respect to the conveyance direction of the main conveying conveyor.

In this aspect, the discharge members include short rollers rotated by power, the short rollers being disposed so as to be tilted with respect to the conveyance direction of the main conveying conveyor. Thus, the conveyed object receives a conveying force in the direction tilted with respect to the conveyance direction of the main conveying conveyor by the short rollers as the discharge members, and is discharged from the main conveying conveyor.

Desirably, the short roller disposed on an outer edge side of a discharge trajectory has a higher rotational speed than the short roller disposed on an inner edge side of the discharge trajectory has, the discharge trajectory being formed when the conveyed object is discharged.

In this aspect, the short roller disposed on the outer edge side of a discharge trajectory when the conveyed object is discharged has a higher rotational speed than the short roller disposed on the inner edge side of the discharge trajectory. Thus, the moving speed of the conveyed object is higher toward the outer edge side of the discharge trajectory. This allows the conveyed object to be easily directed in the direction tilted with respect to the conveyance direction of the main conveying conveyor.

Desirably, the conveyed-object discharge device comprises a long rotator, and a plurality of pulleys provided in the rotator, and a belt is wound between each of a plurality of the short rollers and corresponding one of the plurality of pulleys to rotate the plurality of the short rollers by the rotator.

In this aspect, the conveyed-object discharge device has a long rotator, and a plurality of pulleys provided in the rotator, and belts are wound between the plurality of short rollers and the pulleys corresponding thereto to rotate the plurality of short rollers by one rotator. Thus, by a simple configuration, the plurality of short rollers can be rotationally driven at the same time. In addition, by winding the belts, the direction of the short rollers can be easily changed. That is, by twisting the belts in a range in which power transmission is enabled, the direction of the short rollers can be directed in the direction tilted with respect to the conveyance direction of the main conveying conveyor.

The long rotator may be a motor-incorporating roller that incorporates a motor in a roller body, and the pulleys may be annular grooves formed on an outer periphery of the roller body.

Desirably, the annular grooves have different depths, and the groove corresponding to the short roller disposed on an outer edge side of a discharge trajectory has a shallower depth than the groove corresponding to the short roller disposed on an inner edge side of the discharge trajectory has, the discharge trajectory being formed when the conveyed object is discharged.

In this aspect, the annular grooves have different depths, and the groove corresponding to the short roller disposed on the outer edge side of the discharge trajectory when the conveyed object is discharged has a shallower depth than the groove corresponding to the short roller disposed on the inner edge side of the discharge trajectory. Thus, the groove radius of the roller body is larger toward the outer edge side. Thus, the short-roller rotation amount per rotation of the roller body is larger toward the short roller disposed on the outer edge side. That is, by a very simple configuration in which the groove depth is shallower toward the outer edge side with respect to the same roller body, the rotational speed of the short roller on the outer edge side can be set to be higher than the rotational speed of the short roller on the inner edge side.

Desirably, the conveyed-object discharge device includes a follower member that moves together with the posture change of the base member, and a guide member that comes into contact with the follower member when the follower member moves.

In this aspect, the base member becomes stable when the base member changes its posture.

Desirably, the conveyed-object discharge device includes upstream side discharge members disposed on the upstream side in the flow direction of the main conveying passage, and downstream side discharge members disposed on the downstream side in the flow direction of the main conveying passage, and the upstream side discharge members and the downstream side discharge members can take the following postures:

(1) a posture in which the upstream side discharge members and the downstream side discharge members extend between the conveying bodies;

(2) a posture in which the upstream side discharge members and the downstream side discharge members retract between the conveying bodies;

(3) a posture in which the upstream side discharge members extend between the conveying bodies, and the downstream side discharge members retract between the conveying bodies; and (4) a posture in which the upstream side discharge members retract between the conveying bodies, and the downstream side discharge members extend between the conveying bodies.

Effect of Invention

According to the conveyed-object discharge device of the present invention, even when the conveyance directions of the preceding conveyed object and the succeeding conveyed object are different, the conveyed objects can be conveyed by the conveying bodies and be discharged by the discharge members without stopping the succeeding conveyed object, and the conveyed objects can be continuously immediately conveyed and discharged.

BRIEF DESCRIPTION OF DRAWINGS

FIGS. 10A to 10D are side views of the conveyed-object discharge device, wherein FIG. 10A illustrates a state in which both ends of a base member are raised, FIG. 10B illustrates a state in which both ends of the base member are lowered, FIG. 10C illustrates a state in which one end of the base member is raised and the other end of the base member is lowered, FIG. 10D illustrates a state in which the one end of the base member is lowered and the other end of the base member is raised.

BEST MODE FOR CARRYING OUT THE INVENTION

An embodiment of the present invention will now be described with reference to the drawings.

Figure 1:
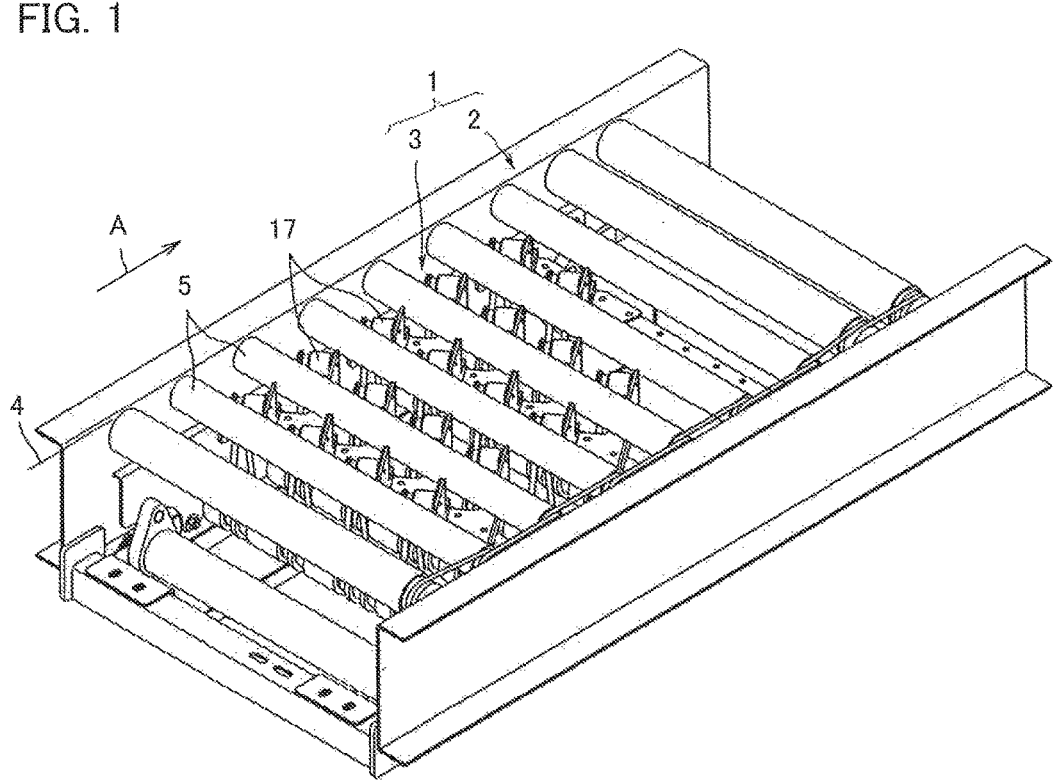
FIG. 1 is a perspective view of a conveyor apparatus including a conveyed-object discharge device according to this embodiment.

As illustrated in FIG. 1, a conveyor apparatus 1 has a main conveying conveyor 2, and a conveyed-object discharge device 3.

Figure 2:
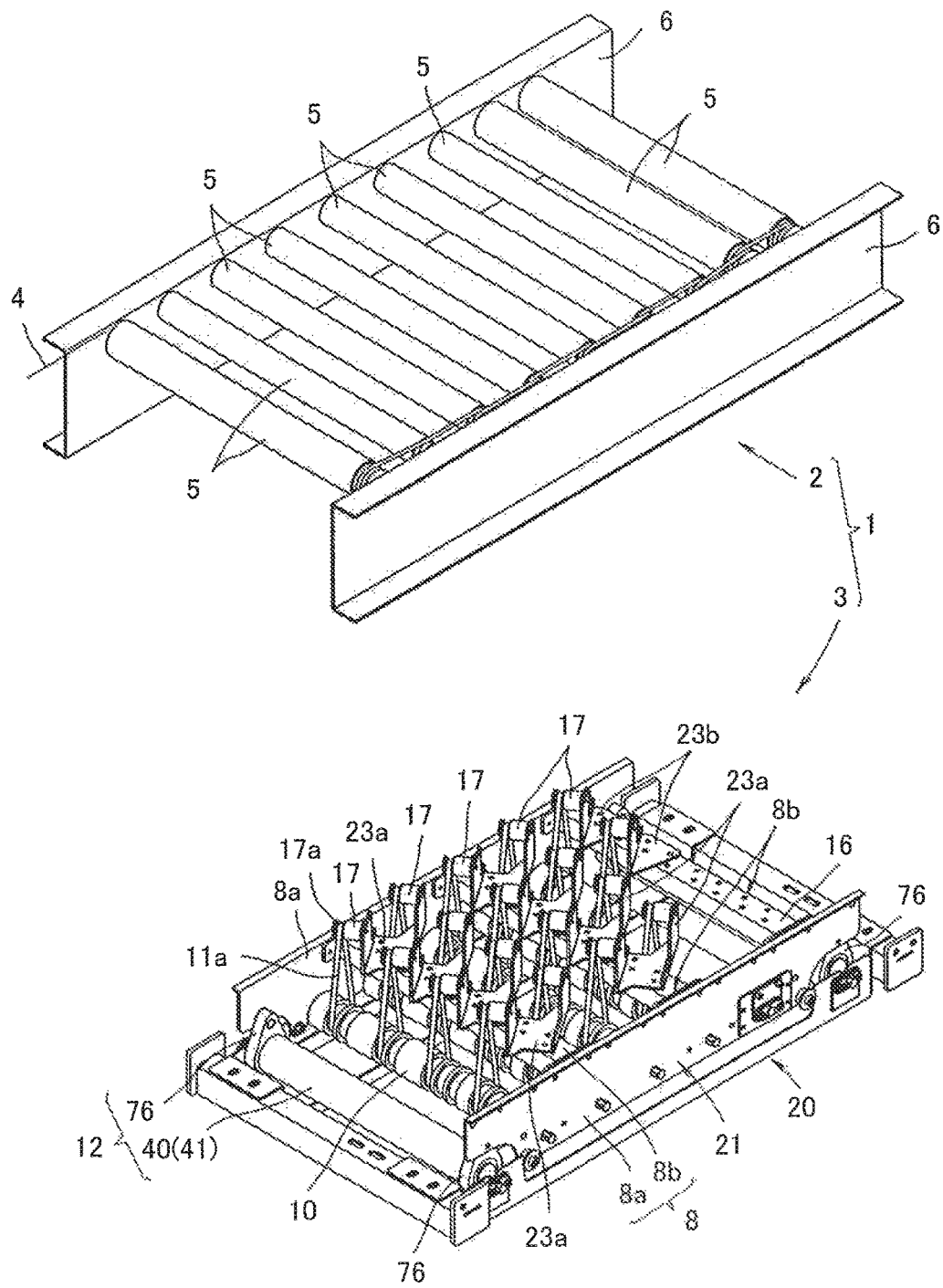
FIG. 2 is an exploded perspective view of the conveyor apparatus in FIG. 1.
Figure 11A:
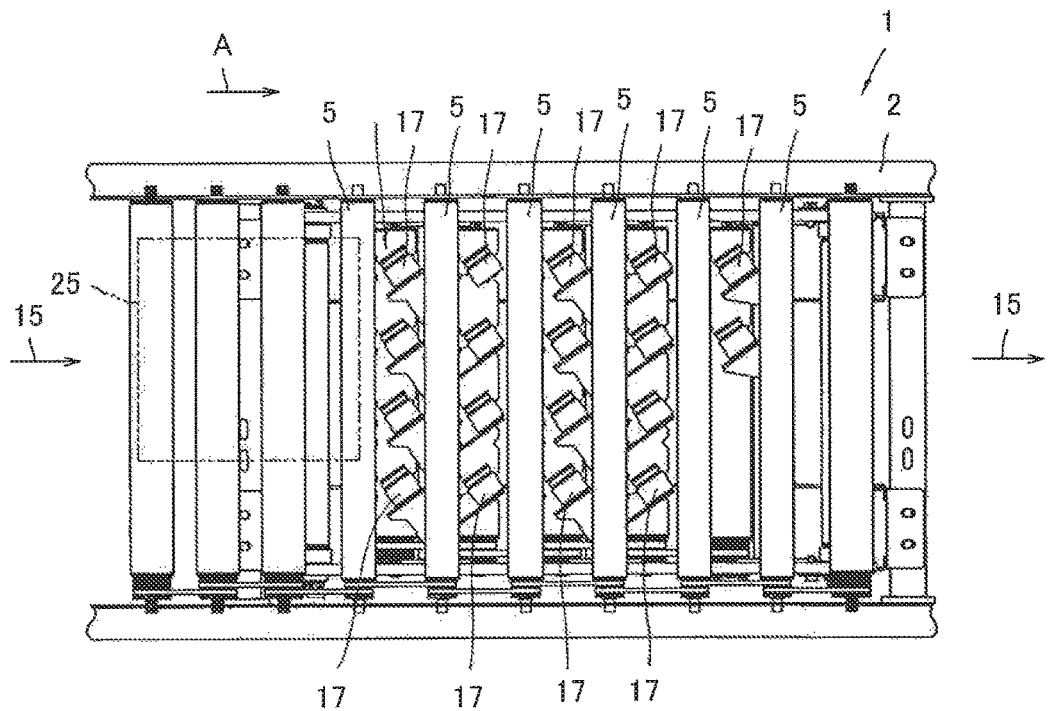
FIG. 11A is a plan view of the conveyor apparatus in FIG. 1, and illustrates a state in which a preceding conveyed object is close to the conveyed-object discharge device.

As illustrated in FIG. 2, the main conveying conveyor 2 has a plurality of rollers 5, and housing bodies 6 that rotatably support the rollers 5. The rollers 5 are disposed in parallel with a predetermined space, and at least one of them is a driving roller (motor-incorporating roller), and the others are follower rollers. Power transmission belts are wound between the rollers 5, and the power of the driving roller is transmitted to the follower rollers. As illustrated in FIG. 1, the upper portions of the rollers 5 configure a conveying plane 4 of the main conveying conveyor 2. That is, a conveyed object 25 (FIGS. 11A and 11B) is conveyed in the conveyance direction indicated by arrow A at the height position of the conveying plane 4 of the main conveying conveyor 2.

Figure 3:
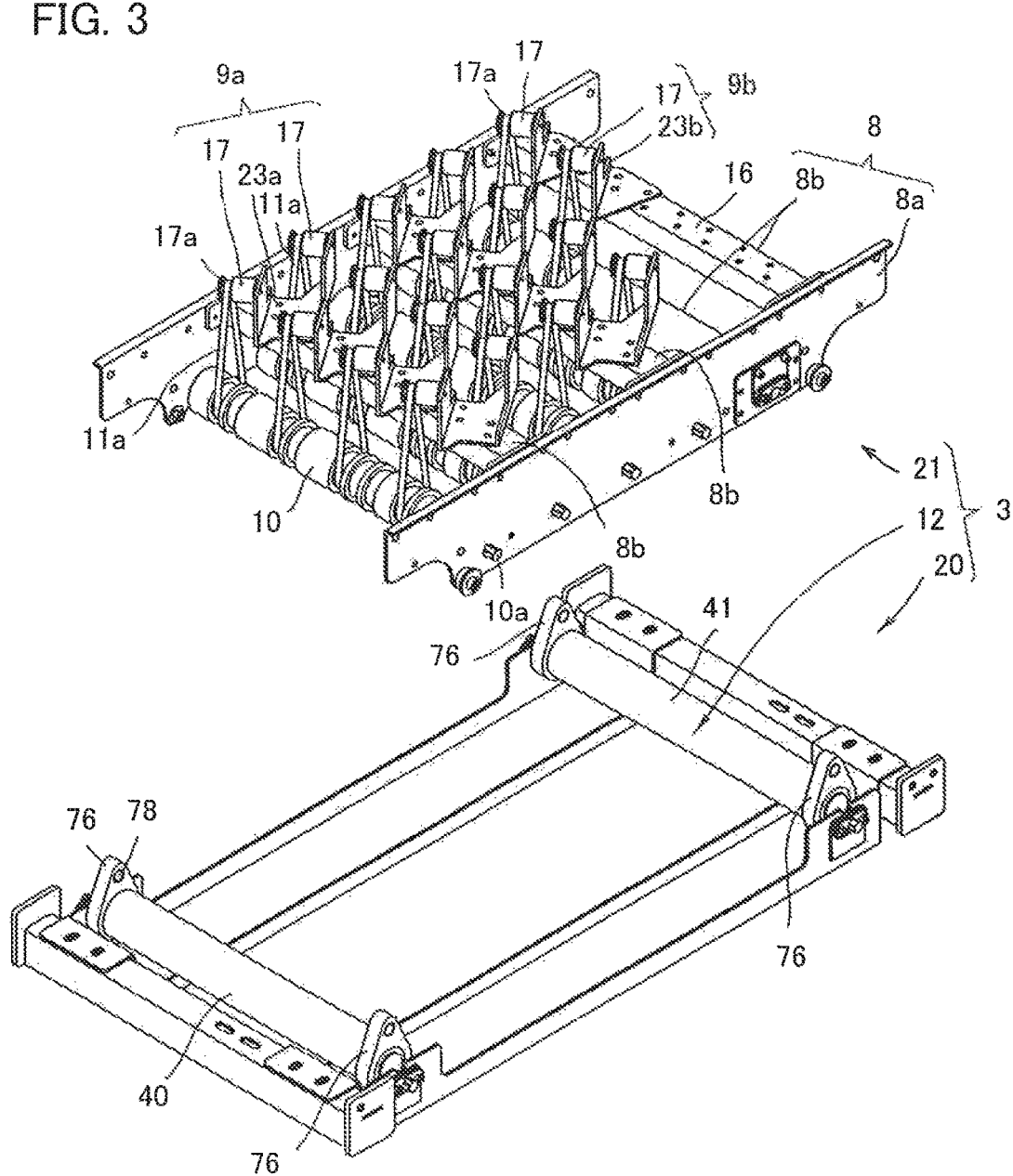
FIG. 3 is an exploded perspective view of the conveyed-object discharge device provided in the conveyor apparatus in FIG. 2.

As illustrated in FIG. 3, the conveyed-object discharge device 3 has a fixing unit 20, a moving unit 21, and a raising and lowering mechanism 12 (base swinging unit, and posture changing unit).

Figure 4:
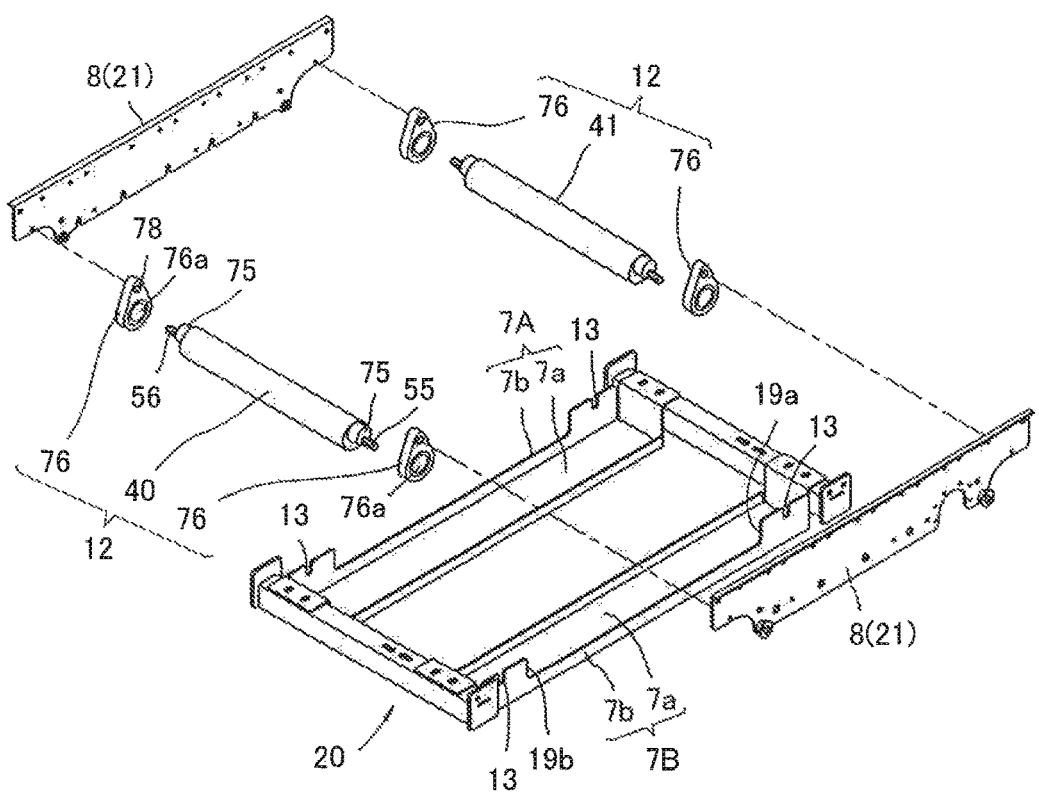
FIG. 4 is an exploded perspective view of a fixing unit and a raising and lowering mechanism of the conveyed-object discharge device in FIG. 3.

As illustrated in FIG. 4, the fixing unit 20 has two bases 7A, 7B.

The bases 7A, 7B have placing portions 7a placed on a floor surface, and erecting vertical portions 7b. The bases 7A, 7B have a configuration so as to bend a substantially rectangular plate member. As illustrated in FIG. 4, the vertical portions 7b are orthogonal to the placing portions 7a, and are disposed on the outer side of the fixing unit 20. Since the vertical portions 7b have the same configuration, the vertical portion 7b of one base 7A will be described below, and the description of the vertical portion 7b of the other base 713 is omitted.

Supporting portions 13 are provided at both ends of the vertical portion 7b. Each supporting portion 13 is a portion that supports a fixing shaft 55 (56) of each of raising and lowering motor-incorporating rollers 40, 41 of the raising and lowering mechanism 12 described later. In addition, the vertical portion 7b has guides 19a, 19b adjacent to the supporting portions 13. The guides 19a, 19b are portions that configure a continuous line on the upper and lower sides of the erecting vertical portion 7b, and are opposite to each other.

The moving unit 21 will now be described with reference to FIG. 5.

The moving unit 21 has a base member 8, discharge members 9, and short-roller driving rollers 10 (rotators), which are integrated.

Figure 5:
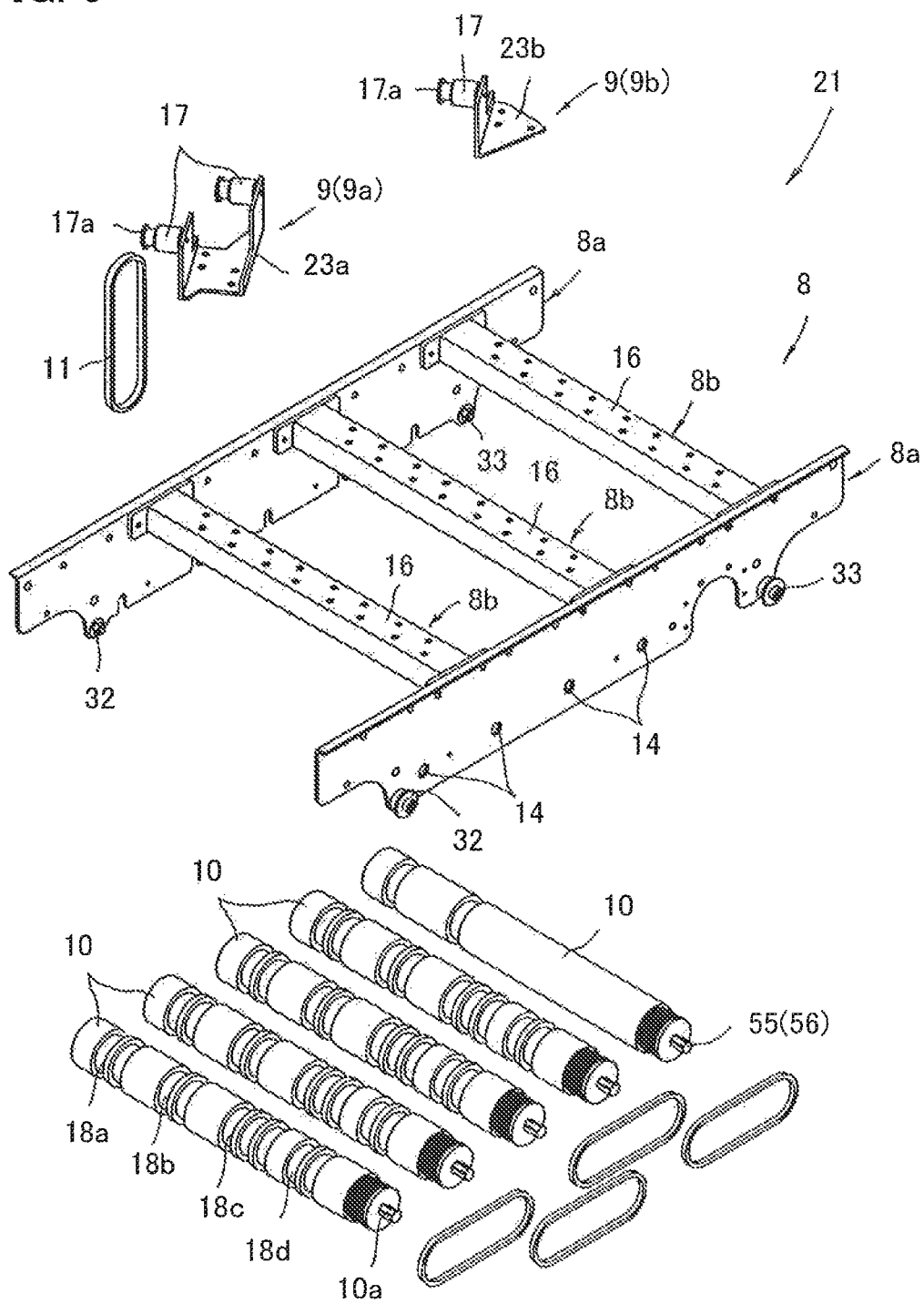
FIG. 5 is an exploded perspective view of a moving unit of the conveyed-object discharge device in FIG. 3.

As illustrated in FIG. 5, the base member 8 includes two longitudinal members 8a, and a plurality of lateral members 8b.

Each longitudinal member 8a is an elongated plate-shaped member, and has a plurality of holes 14 with an equal space along the longer direction. In addition, near both ends of the longitudinal member 8a, pressing members (follower members) 32, 33 are provided. The pressing members 32, 33 are members projecting from the longitudinal member 8a. When the base member 8 is swung to change its posture, the pressing members 32, 33 move together with the base member 8.

The two longitudinal members 8a having such a configuration are disposed in parallel so as to be opposite to each other. When the two longitudinal members 8a are disposed in parallel, the pressing members (follower members) 32, 33 project to outside. In addition, the two longitudinal members 8a are coupled and fixed by the plurality of lateral members 8b. The lateral members 8b are members having horizontal placing surfaces 16, and are disposed with an equal space along the longer direction of the longitudinal members 8a.

On the placing surface 16 of each lateral member 8b, a plurality of discharge members 9 are provided along the longer direction of the lateral member 8b. The discharge members 9 include short rollers 17 rotating about horizontal axes, and support bases 23 supporting the short rollers 17. The support bases 23 are fixed to the placing surface 16 of the lateral member 8b by fixing means, such as screwing. The short rollers 17 are rotatably supported by shafts 17a fixed to the support bases 23. The shafts 17a are tilted at e.g., 15° to 45° with respect to the longer direction of the lateral member 8b. That is, the discharge members 9 are fixed so as to be tilted at a predetermined angle with respect to the lateral member 8b of the base member 8. In addition, the short rollers 17 deviate from above the placing surface 16 of the lateral member 8b, seen in plan view.

As illustrated in FIG. 5, the discharge members 9 include a discharge member 9a having two short rollers 17, and a discharge member 9b having one short roller 17. That is, a support base 23a of the discharge member 9a and a support base 23b of the discharge member 9b are different in shape. In the discharge member 9a, the two short rollers 17 project from both sides of the lateral member 8b, seen in plan view, while in the discharge member 9b, the one short roller 17 projects from one of both sides of the lateral member 8b, seen in plan view.

The lateral members 8b may have the same number of the discharge members 9 provided, and the number of the discharge members 9 can be larger toward the upstream side in conveyance direction A, and can be smaller toward the downstream side in conveyance direction A. That is, since the discharge members 9 on the opposite side of the discharge direction are harder to come into contact with the conveyed object 25 as the conveyed object 25 is moved toward the downstream side, the discharge members 9 in that region can be omitted, and the number of the discharge members 9 provided can be smaller from the upstream side toward the downstream side. For example, when the region in which the discharge members 9 are provided is seen in plan view, the number of the discharge members 9 may be smaller from four to three, two, and one so as to configure a triangle.

Figure 7:
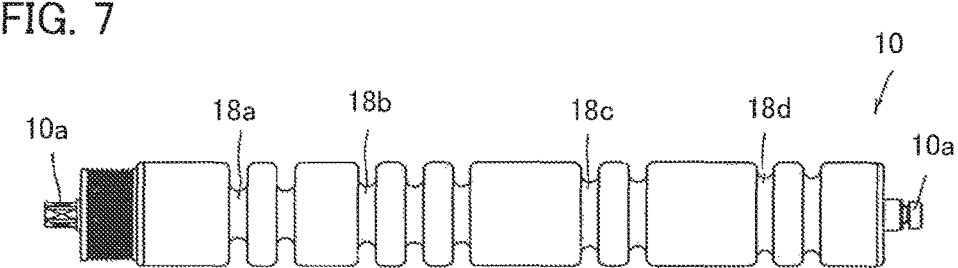
FIG. 7 is a side view of a roller that parts power to short rollers of discharge members.

Each hole 14 of each longitudinal member 8*a* supports a shaft 10*a* of each short-roller driving roller 10. That is, through each hole 14, the shaft 10*a* of the short-roller driving roller 10 is inserted. As illustrated in FIG. 7, on the peripheral face of the short-roller driving roller 10, a plurality of grooves 18*a* to 18*d* are provided with a predetermined space in that order from the left end, seen in FIG. 7. The groove depth of the grooves 18*a* to 18*d* is formed to be shallower from the left side (the groove 18*a* side) to the right side (the groove 18*d* side), seen in FIG. 7. In place of providing the grooves 18*a* to 18*d* in the short-roller driving roller 10, pulleys having different diameters may be mounted. For facilitating the understanding, FIG. 7 exaggeratedly illustrates the grooves 18*a* to 18*d*. The actual grooves 18*a* to 18*d* are shallower than those shown in FIG. 7.

At least one of the plurality of short-roller driving rollers 10 is a driving roller (motor-incorporating roller)/driving source, and the others are follower rollers. The short-roller driving rollers 10 are coupled by belts, and the power of the driving roller is transmitted to the follower rollers. Thus, when the driving roller/driving source is actively driven, all the short-roller driving rollers 10 rotate together.

Figure 6:
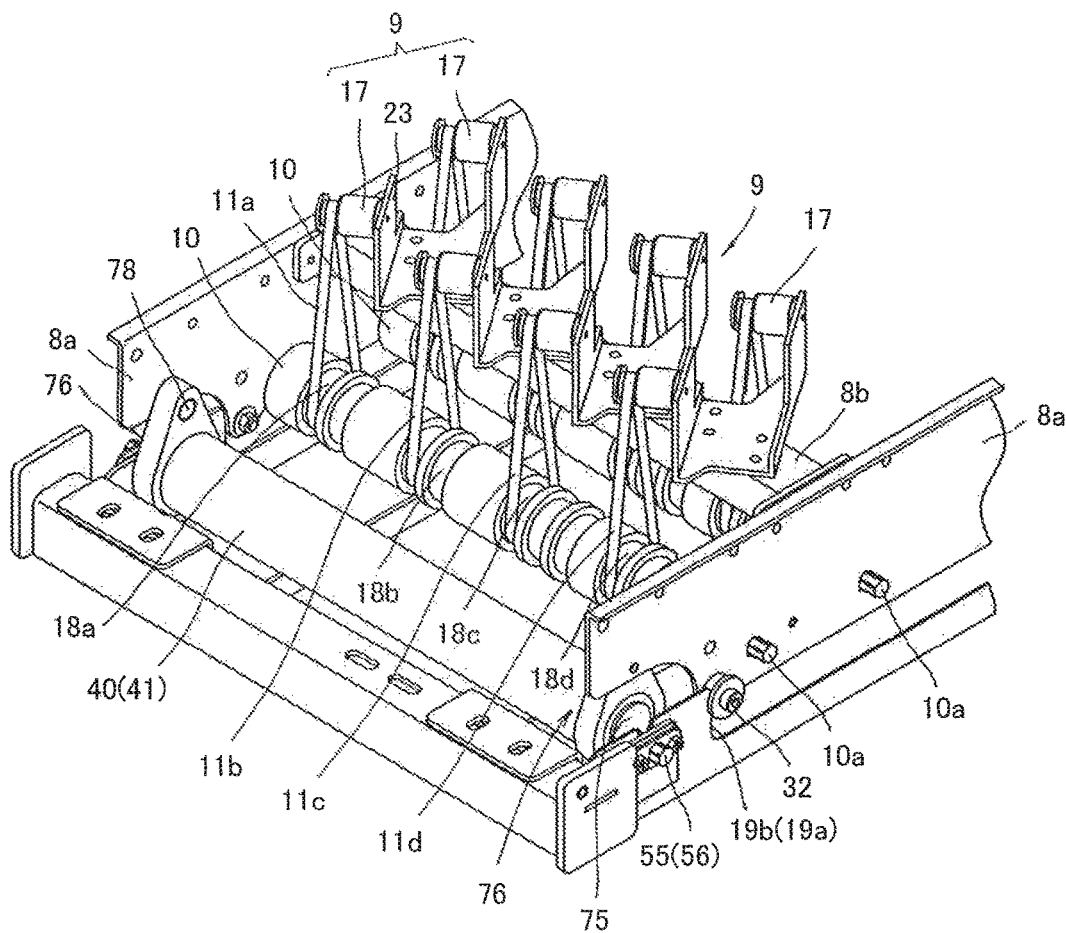
FIG. 6 is a partially enlarged perspective view of the conveyed-object discharge device in FIG. 3.

The short-roller driving rollers 10 are disposed immediately below the short rollers 17 of the discharge members 9 provided on the lateral members 8*b*. The shafts 17*a* of the short rollers 17 are tilted with respect to each short-roller driving roller 10 at 15° to 45°, seen in plan view, and the direction of the short rollers 17 and the direction of the short-roller driving roller 10 are different. In addition, on the short rollers 17 and the grooves 18*a* to 18*d* of the short-roller driving roller 10 immediately therebelow, belts 11*a* to 11*d* (FIG. 6) are wound. The belts 11*a* to 11*d* are twisted in the portions between the short rollers 17 and the short-roller driving roller 10, but can transmit power. That is, when the short-roller driving roller 10 rotates, the rotational force is transmitted to the short rollers 17 through the belts 11*a* to 11*d* to rotate the short rollers 17.

The rotational speed of the short roller 17 on which the belt 11*a* is wound is the lowest, and the rotational speed of the short roller 17 on which the belt 11*d* is wound is the highest. That is, the belt 11*a* is wound on the deepest groove 18*a* in the short-roller driving roller 10, and the belt 11*d* is wound on the shallowest groove 18*d* in the short-roller driving roller 10. The outer peripheral length of the shallow groove is longer than the outer peripheral length of the deep groove. Thus, the belt traveling distance per rotation of the shared short-roller driving roller 10 is longer toward the belt wound on the shallow groove. That is, the short roller rotation amount per unit time is larger toward the short roller 17 on which the belt whose traveling distance is long is wound, so that the rotational speed of the short roller 17 is high.

The conveyed object 25 (FIG. 1) placed at the same time on the short roller 17 whose rotational speed is high and the short roller 17 whose rotational speed is low forms a trajectory (discharge trajectory) in which the short roller 17 whose rotational speed is low is on its inner edge side and the short roller 17 whose rotational speed is high is on its outer edge side, thereby changing the conveyance direction.

When two belts 11*a* (11*b* to 11*d*) are wound on two short rollers 17 of each discharge member 9*a*, the discharge member 9*a* receives downward forces from the belts 11*a* (11*b* to 11*d*). However, as described above, each short roller 17 projects from both sides of each lateral member 8*b*, and the forces received from the two belts 11*a* (11*b* to 11*d*) apply to both sides of the lateral member 8*b* for balancing. Thus, the discharge member 9*a* is equally pressed against the lateral member 8*b*. That is, the discharge member 9*a* is stably supported by the lateral member 8*b*.

The rotational driving of each short-roller driving roller 10 is controlled by a control device, not illustrated. That is, the rotation of the short rollers 17 is controlled by the control device, not illustrated.

The base member 8, the discharge members 9, and the short-roller driving rollers 10 are integrated to configure the moving unit 21.

The raising and lowering mechanism 12 will now be described. The raising and lowering mechanism 12 is a mechanism that swings the base member 8 and changes the posture thereof. Thus, the raising and lowering mechanism 12 is a swinging unit and posture changing unit.

The raising and lowering mechanism 12 illustrated in FIGS. 3 and 4 has the function of individually raising and lowering one end of the moving unit 21 while being supported by the fixing unit 20. The raising and lowering mechanism 12 has the two raising and lowering motor-incorporating rollers 40, 41, and rings 76 (conversion unit) disposed at both ends of each of the raising and lowering motor-incorporating rollers 40, 41.

Figure 9:
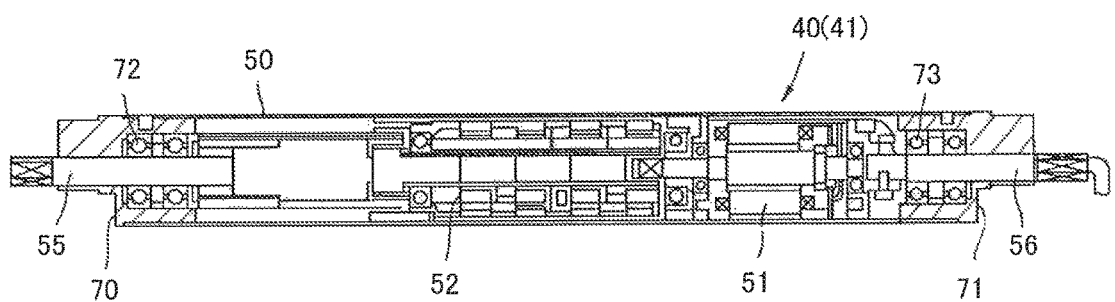
FIG. 9 is a cross-sectional view of the raising and lowering motor-incorporating roller according to the present invention.

As illustrated in FIG. 9, each of the raising and lowering motor-incorporating rollers 40, 41 incorporates a motor 51 and a speed reducer 52 in a tubular body 50, like a known motor-incorporating roller, and reduces the speed of the rotation of the motor 51 to transmit it to the tubular body 50. Both of the fixing shafts 55, 56 projecting from the tubular body 50 do not rotate at all. When the motor 51 is driven, the rotational force of the motor 51 is transmitted through the speed reducer 52 to the tubular body 50. As a result, the speed of the outside tubular body 50 is reduced to rotate.

In each of the raising and lowering motor-incorporating rollers 40, 41, the speed reducer 52 having a standard speed reduction ratio is adopted. In addition, each of the raising and lowering motor-incorporating rollers 40, 41 includes a resisting member therein to stabilize the posture of the base member 8 (fixing unit 20). Further, each of the raising and lowering motor-incorporating rollers 40, 41 includes cover members 70, 71 having a special shape.

That is, the tubular body 50 is a member opened at both ends, the both ends being sealed by the cover members 70, 71. Between the cover member 70 and the fixing shaft 55, a bearing 72 is interposed. Between the cover member 71 and the fixing shaft 56, a bearing 73 is interposed. The cover members 70, 71 rotate together with the tubular body 50, and the fixing shafts 55, 56 do not rotate.

Figure 8:
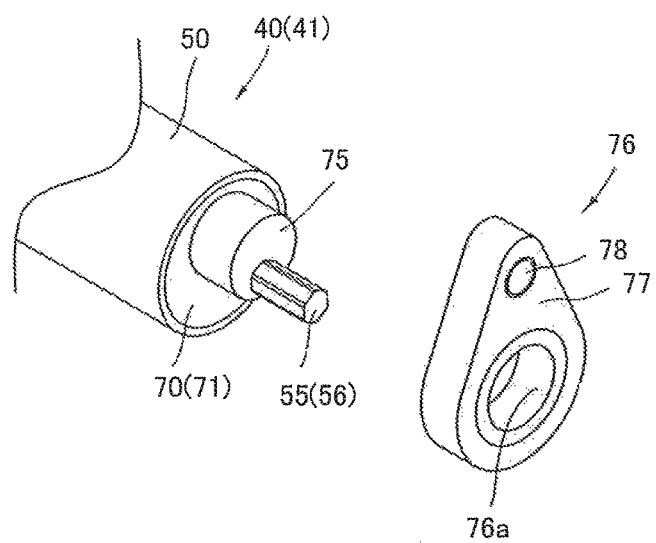
FIG. 8 is a perspective view of the end of a raising and lowering motor-incorporating roller according to the present invention.

The cover members 70, 71 have a special shape, and have an eccentric configuration, as illustrated in FIG. 8. That is, each of the cover members 70, 71 includes a portion fitted to the tubular body 50, and a portion projecting from the tubular body 50, the projecting portion having a hole with a center eccentric with respect to each of the fixing shafts 55, 56, the projecting portion being a circular projection (conversion unit) 75.

As illustrated in FIG. 8, the ring 76 (conversion unit) has a hole 76*a*, and a hole 78. Between the hole 76*a* and the hole 78, a joining portion 77 is provided. Into the hole 76*a*, the circular projection 75 is fitted via a bearing. Into the hole 78, a shaft whose axis is on an alternate long and short dash line in FIG. 4 (not illustrated) is inserted, and via the shaft, the ring 76 and the longitudinal member 8*a* of the base member 8 are connected so as to be relatively rotatable. That is, via the ring 76, the raising and lowering motor-incorporating roller 40 (41) and the base member 8 (longitudinal member 8*a*) of the moving unit 21 are connected.

Each of the fixing shafts 55, 56 of each of the raising and lowering motor-incorporating rollers 40, 41 extends through the ring 76, and is mounted on each supporting portion 13 of each base 7 of the fixing unit 20.

The two raising and lowering motor-incorporating rollers 40, 41 can be individually independently rotated and synchronously rotated by the control device, not illustrated.

When the raising and lowering motor 40 (41) is rotated, the inner wall of the hole 76*a* of the ring 76 is pressed onto the circular projection 75, and the ring 76 is swung about the shaft inserted through the hole 78. As a result, the height of the shaft inserted through the hole 78 is changed to change the height of the base member 8 (moving unit 21).

The ring 76 and the circular projection 75 are a type of cam, and the rotation of the circular projection 75 changes the height of the connecting portion to the base member 8.

A pair of rings 76 connected to the raising and lowering motor-incorporating roller 40 are connected to one end of the base member 8, and a pair of rings 76 connected to the raising and lowering motor-incorporating roller 41 are connected to the other end of the base member 8.

Figure 10A:
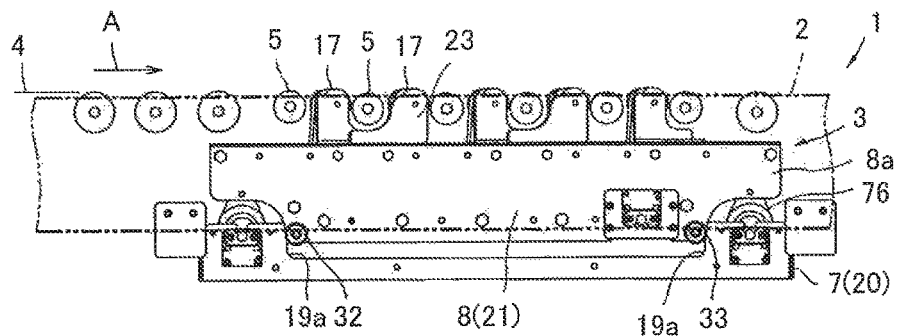
Figure 10B:
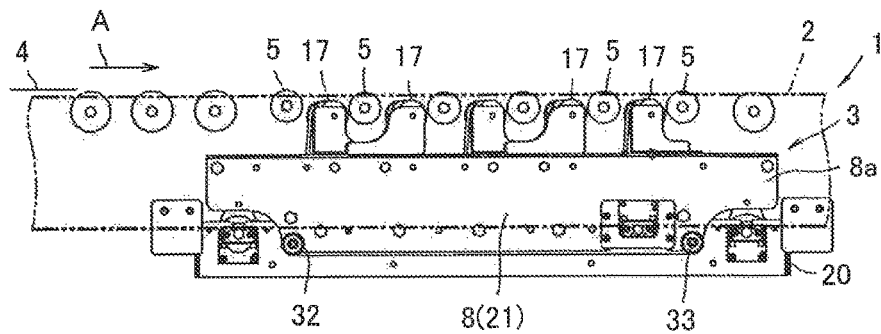

The two raising and lowering motor-incorporating rollers 40, 41 are synchronously rotated, and as illustrated in FIGS. 10A and 10B, the base member 8 (moving unit 21) can be raised and lowered without being tilted with respect to the bases 7 (fixing unit 20).

Figure 10C:
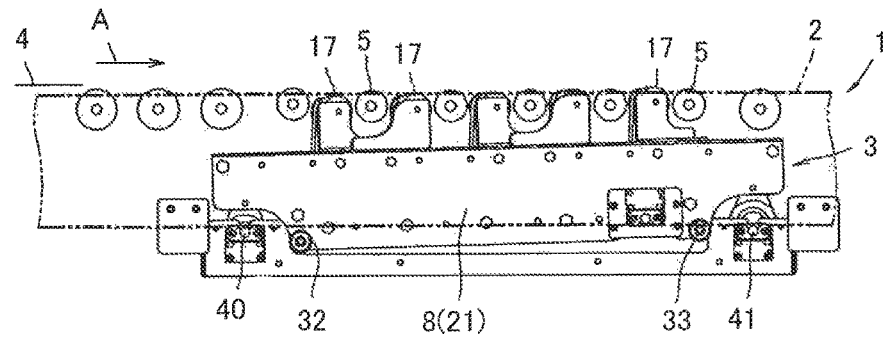
Figure 10D:
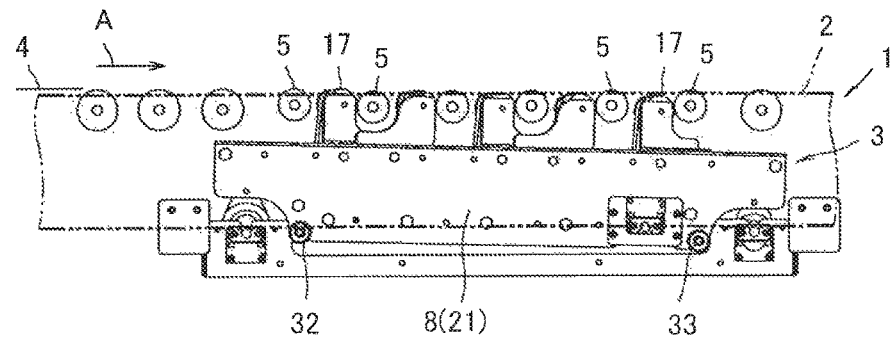

Only one of the raising and lowering motor-incorporating rollers 40, 41 is rotated, and as illustrated in FIG. 10C, the portion on the upstream side of the moving unit 21 (the upstream side in conveyance direction A) can be lowered and the portion on the downstream side of the moving unit 21 can be raised, and as illustrated in FIG. 10D, the portion on the upstream side of the moving unit 21 (the upstream side in conveyance direction A) can be raised and the portion on the downstream side of the moving unit 21 can be lowered.

By rotating only one of the raising and lowering motor-incorporating rollers 40, 41, the base member 8 of the moving unit 21 is swung.

Further, from the states illustrated in FIGS. 10A and 10B, only one of the raising and lowering motor-incorporating rollers 40, 41 is independently rotated, so that only the portion on the upstream side of the moving unit 21 or only the portion on the downstream side of the moving unit 21 can be raised and lowered.

When the moving unit 21 is raised, the short rollers 17 of the discharge members 9 extend (raise) upwardly of the conveying plane 4 of the rollers 5. In addition, when the moving unit 21 is lowered, the short rollers 17 retract (lower) downwardly of the conveying plane 4 of the rollers 5.

Thus, when the discharge members disposed on the upstream side in the flow direction of the main conveying passage are upstream side discharge members, and the discharge members disposed on the downstream side in the flow direction of the main conveying passage are downstream side discharge members, the upstream side discharge members and the downstream side discharge members can take the following postures:

(1) a posture in which the upstream side discharge members and the downstream side discharge members extend upward between the rollers 5 (a state in which the base member 8 takes the horizontal posture, and the discharge members are raised);

(2) a posture in which the upstream side discharge members and the downstream side discharge members retract between the rollers 5 (a state in which the base member 8 takes the horizontal posture, and the discharge members are lowered);

(3) a posture in which the upstream side discharge members extend upward between the rollers 5 and the downstream side discharge members retract between the rollers 5 (a state in which the base member 8 takes the tilted posture, the upstream side discharge members raise, and the downstream side discharge members lower); and (4) a posture in which the upstream side discharge members retract between the rollers 5 and the downstream side discharge members extend upward between the rollers 5 (a state in which the base member 8 takes the tilted posture, the upstream side discharge members lower, and the downstream side discharge members raise).

When the base member 8 is changed from the horizontal posture to the tilted posture, and when the base member 8 is changed from the tilted posture to the horizontal posture, the base member 8 is swung.

When only the raising and lowering motor-incorporating roller 40 is driven to raise and lower only the portion on the upstream side of the moving unit 21, the pressing members 32 provided in the base member 8 (longitudinal members 8*a*) of the moving unit 21 move along the guides 19*a* provided in the bases 7 (vertical portions 7*b*) of the fixing unit 20. Thus, the posture of the moving unit 21 becomes stable.

The conversion unit including the circular projection 75 and the ring 76 can be replaced with another configuration. For example, as the conversion unit a cam mechanism, a crank mechanism, a link mechanism, a rack and pinion, and a screw can be adopted.

The operation of the conveyor apparatus 1 will now be described.

On the upstream side and the downstream side in conveyance direction A of the conveyor apparatus 1, other conveyance conveyors, not illustrated, are adjacently disposed to configure a main conveying passage 15 conveying the conveyed object 25 (FIG. 11). The conveyed object 25 is conveyed along the main conveying passage 15. The conveyor apparatus 1 including the conveyed-object discharge device 3 can directly convey the conveyed object 25 conveyed from the other conveyance conveyor on the upstream side to the different conveyance conveyor on the downstream side along the main conveying passage 15, and can discharge the conveyed object 25 in the direction different from that of the main conveying passage 15.

That is, by creating a state in which the base member 8 takes the horizontal posture and the discharge members raise, the conveyed object 25 and a conveyed object 26 can be continuously discharged laterally from the main conveying passage 15.

By creating a state in which the base member 8 takes the horizontal posture and the discharge members lower, the conveyed objects 25, 26 can be continuously conveyed along the main conveying passage 15.

By creating a state in which the base member 8 takes the tilted posture, the upstream side discharge members raise, and the downstream side discharge members lower, while the preceding conveyed object 25 is straightly moved on the downstream side, the succeeding conveyed object 26 can be received on the upstream side to be discharged laterally.

By creating a state in which the base member 8 takes the tilted posture, the upstream side discharge members lower, and the downstream side discharge members raise, while the preceding conveyed object 25 is discharged laterally on the downstream side, the succeeding conveyed object 26 can be received on the upstream side to be straightly moved.

Figure 11B:
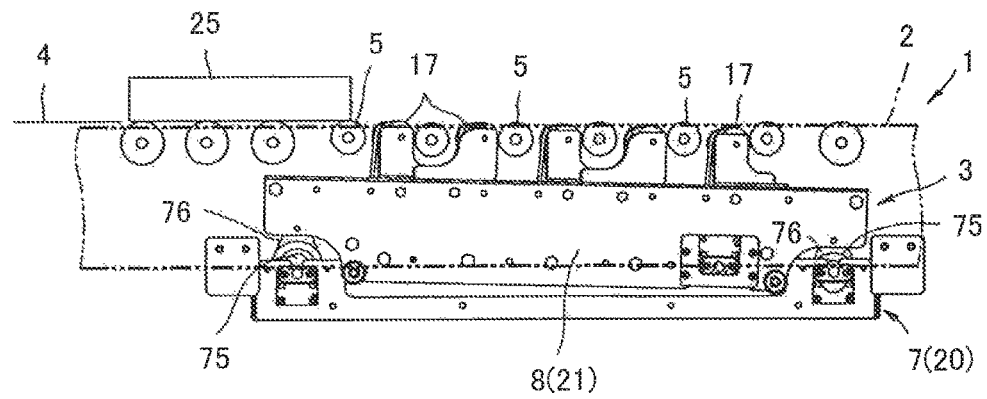
FIG. 11B is a side view of FIG. 11A.

For example, as illustrated in FIG. 11, when the preceding conveyed object 25 is conveyed on the main conveying conveyor 2 of the conveyor apparatus 1 and a sensor, not illustrated, detects that the conveyance destination for the conveyed object 25 is the discharge destination in the direction different from that of the main conveying passage 15, the control device, not illustrated, raises the discharge members 9 (short rollers 17) of the conveyed-object discharge device 3 upwardly from the conveying plane 4 (FIG. 11B).

In this embodiment, the base member 8 takes the tilted posture, the upstream side discharge members raise, and the downstream side discharge members lower. As a result, as illustrated in FIG. 11B, the upstream side discharge members extend upward between the rollers 5, and the downstream side discharge members retract between the rollers 5.

The conveyed object 25 is moved onto the short rollers 17 of the upstream side discharge members.

Figure 12A:
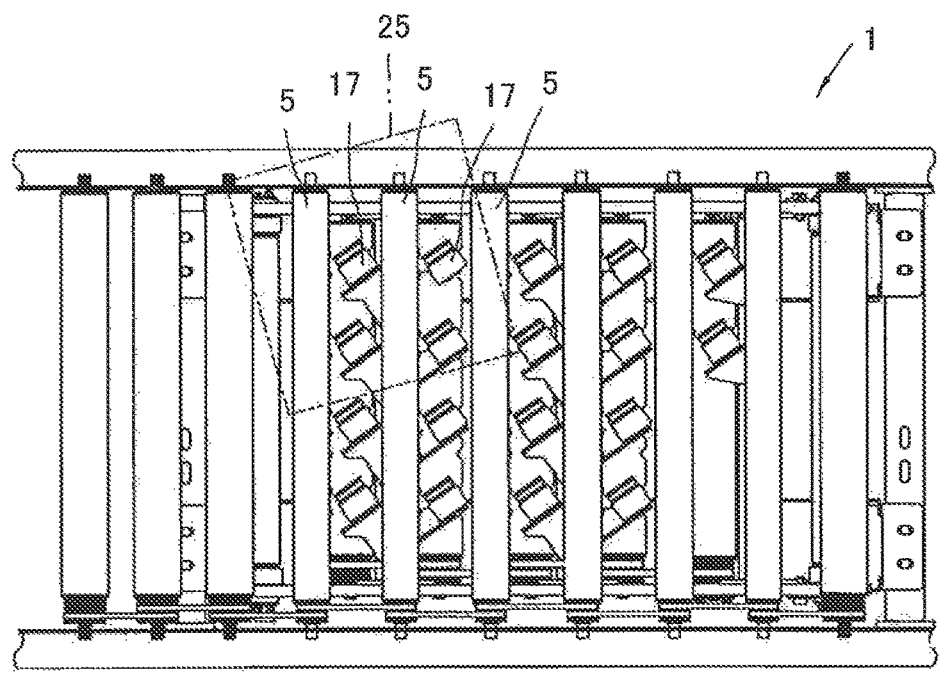
FIG. 12A is a plan view of the conveyor apparatus in FIG. 1, and illustrates a state in which the preceding conveyed object is discharged from a main conveyor by the discharge members on the upstream side of the conveyed-object discharge device.
Figure 12B:
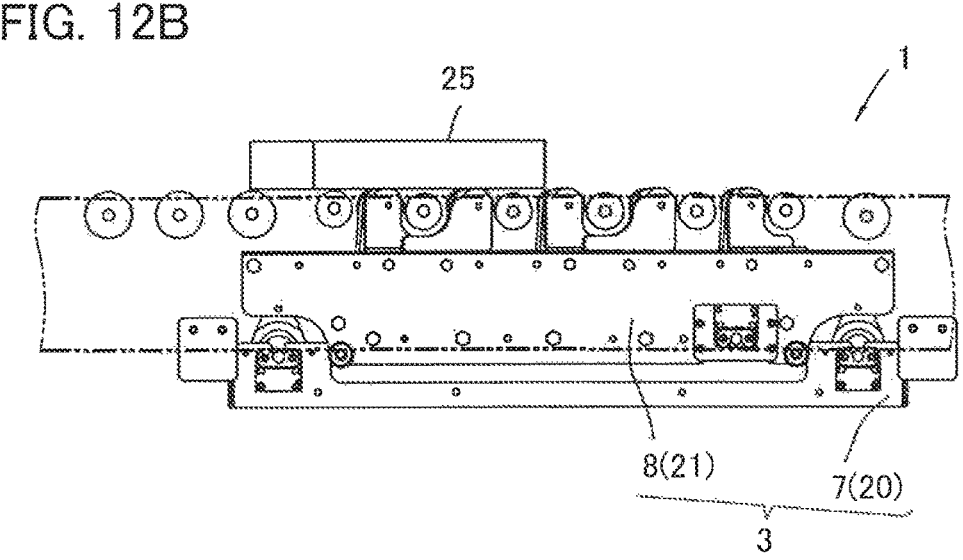
FIG. 12B is a side view of FIG. 12A.

Then, the raising and lowering mechanism 12 is operated, so that the base member 8 is swung to be changed the posture into a state in which, as illustrated in FIG. 12, the base member 8 takes the horizontal posture and the discharge members 9 (short rollers 17) raise. As a result, as illustrated in FIG. 12, the upstream side discharge members and the downstream side discharge members extend upward between the rollers 5.

Figure 13A:
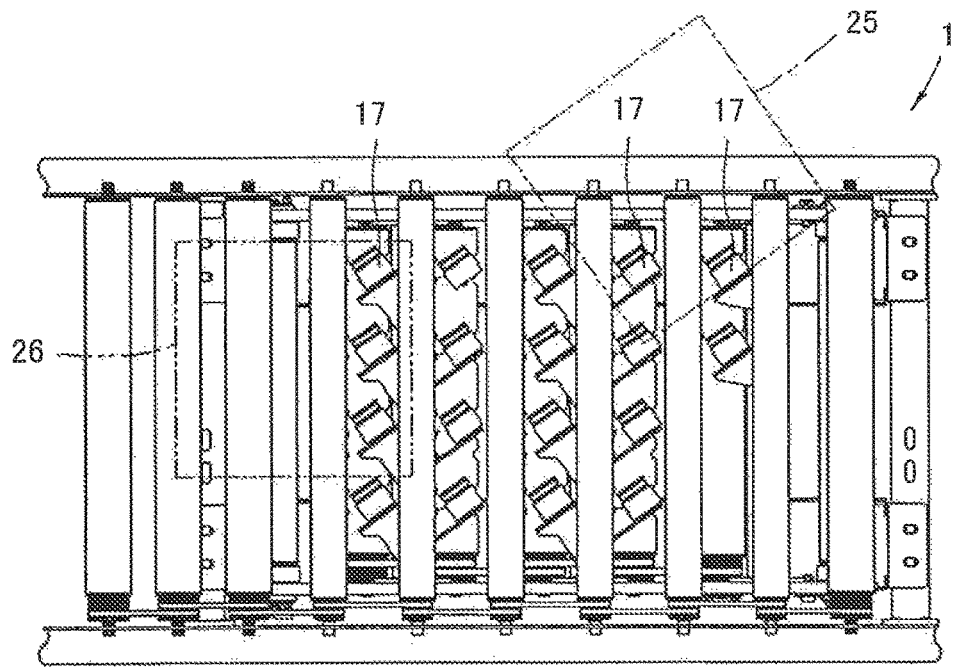
FIG. 13A is a plan view of the conveyor apparatus in FIG. 1, and illustrates a state in which the preceding conveyed object is discharged from the main conveyor by the discharge members on the downstream side of the conveyed-object discharge device, and a succeeding conveyed object is moved upwardly of the discharge members on the upstream side of the conveyed-object discharge device.

Thus, as illustrated in FIG. 12, the preceding conveyed object 25 is guided in the tilt direction (discharge destination) by the rotating short rollers 17. Further, as illustrated in FIG. 13, the conveyed object 25 is moved from the discharge members 9 (short rollers 17) on the upstream side of the conveyed-object discharge device 3 to the discharge members 9 (short rollers 17) on the downstream side of the conveyed-object discharge device 3.

In addition, the succeeding conveyed object 26 is conveyed on the main conveying conveyor 2 following the preceding conveyed object 25. When the conveyance destination for the succeeding conveyed object 26 is in the straight movement direction along the main conveying conveyor 2 (main conveying passage 15), the control device, not illustrated, drives the raising and lowering motor-incorporating roller 40 on the upstream side, and swings the base member 8 to change the posture, as illustrated in FIG. 13. That is, the base member 8 is changed the posture into a state in which the base member 8 takes the tilted posture, the upstream side discharge members lower, and the downstream side discharge members raise. As a result, the upstream side discharge members retract between the rollers 5, and the downstream side discharge members extend upward between the rollers 5.

Figure 13B:
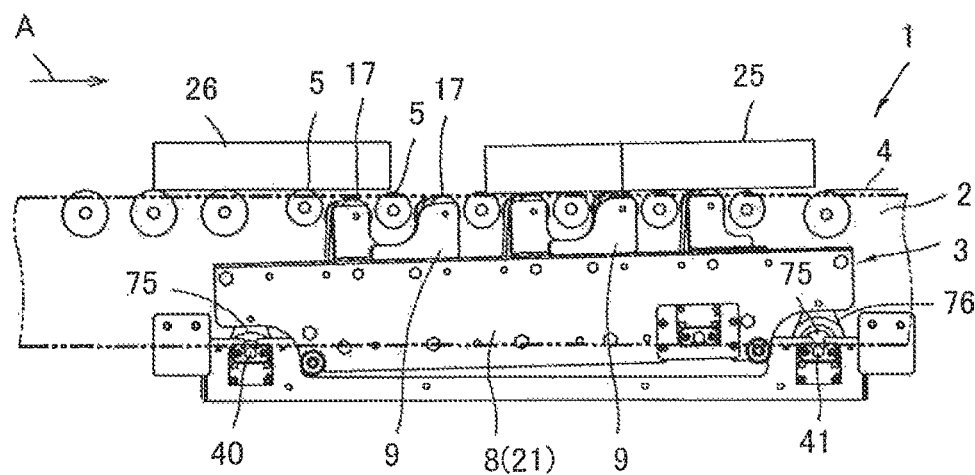
FIG. 13B is a side view of FIG. 13A.

Thus, the discharge members 9 (short rollers 17) on the upstream side retract downwardly of the conveying plane 4 (FIG. 13B). At this time, the discharge members 9 (short rollers 17) on the downstream side extend upwardly from the conveying plane 4, so that the preceding conveyed object 25 is continuously discharged laterally, and the discharge members 9 (short rollers 17) on the upstream side retract downwardly from the conveying plane 4, so that the succeeding conveyed object 26 is conveyed along the main conveying conveyor 2 by the rollers 5.

In this way, by creating a state in which the base member 8 takes the tilted posture, the upstream side discharge members lower, and the downstream side discharge members raise, the upstream side discharge members extend between the conveying bodies, and the downstream side discharge members retract between the conveying bodies. Thus, while the preceding conveyed object 25 is discharged laterally on the downstream side, the succeeding conveyed object 26 can be received on the upstream side to be straightly moved.

Figure 14A:
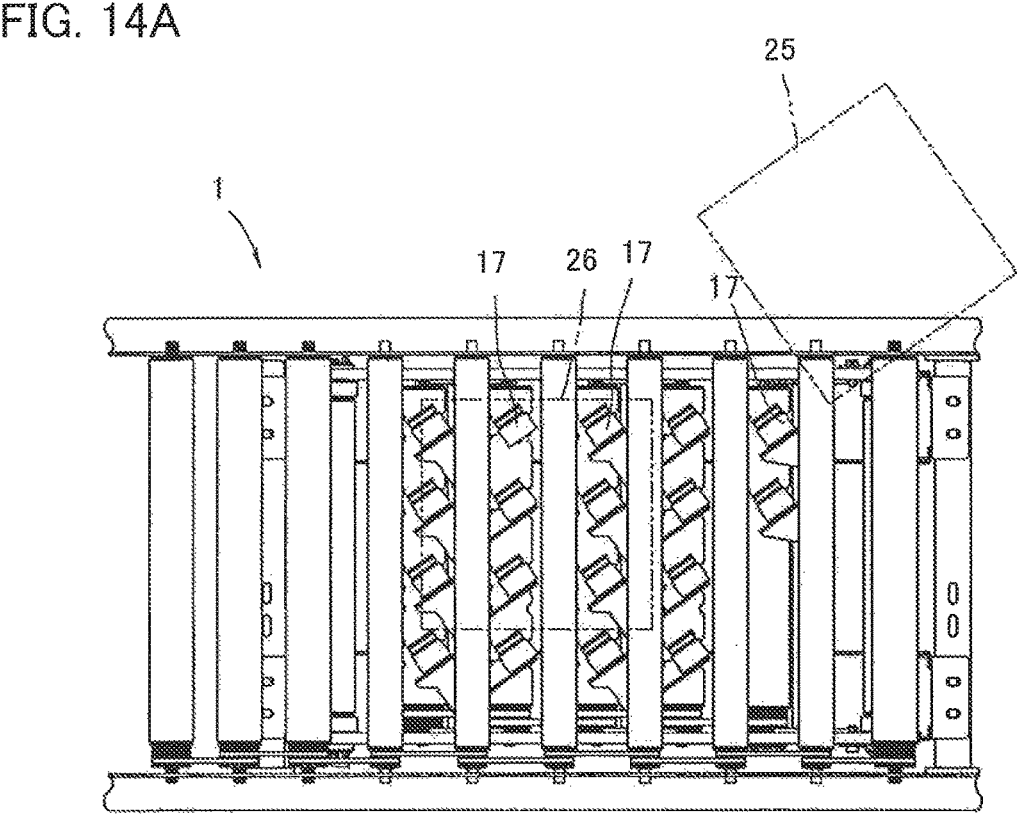
FIG. 14A is a plan view of the conveyor apparatus in FIG. 1, and illustrates a state in which the preceding conveyed object is discharged from the main conveyor, and the succeeding conveyed object is conveyed to the downstream side by the main conveyor and is on the conveyed-object discharge device.
Figure 14B:
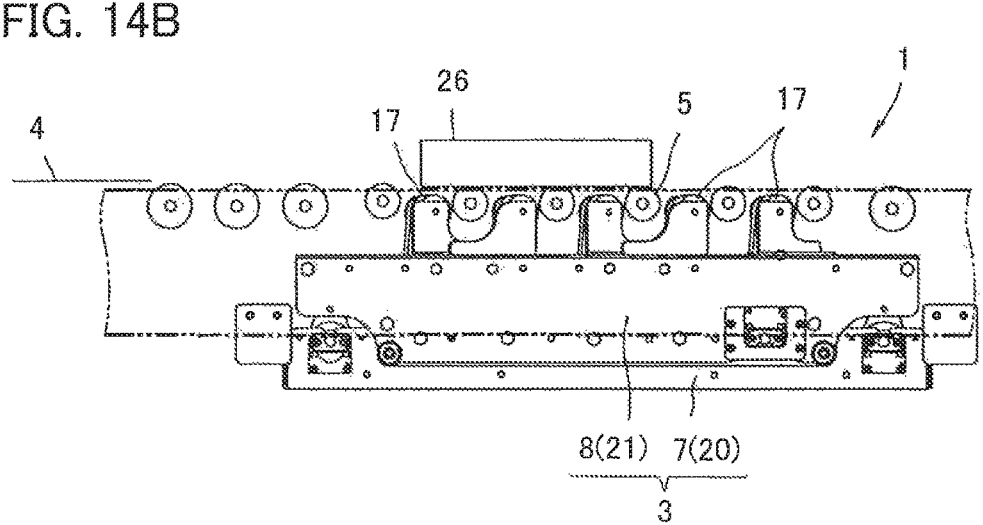
FIG. 14B is a side view of FIG. 14A.

As illustrated in FIG. 14, when the preceding conveyed object 25 is discharged from the main conveying conveyor 2, the succeeding conveyed object 26 is moved to the further downstream side along the main conveying conveyor 2.

Here, in this embodiment, the base member 8 is changed into a state in which the base member 8 takes the horizontal posture and the discharge members lower. As a result, the upstream side discharge members and the downstream side discharge members retract between the conveying bodies.

Specifically, the control device, not illustrated, drives the raising and lowering motor-incorporating roller 41 on the downstream side, and swings the base portion 8 to make the discharge members 9 (short rollers 17) on the downstream side retract below the conveying plane 4. Thus, the succeeding conveyed object 26 is conveyed to the downstream side along the main conveying conveyor 2 by the rollers 5.

Figure 15A:
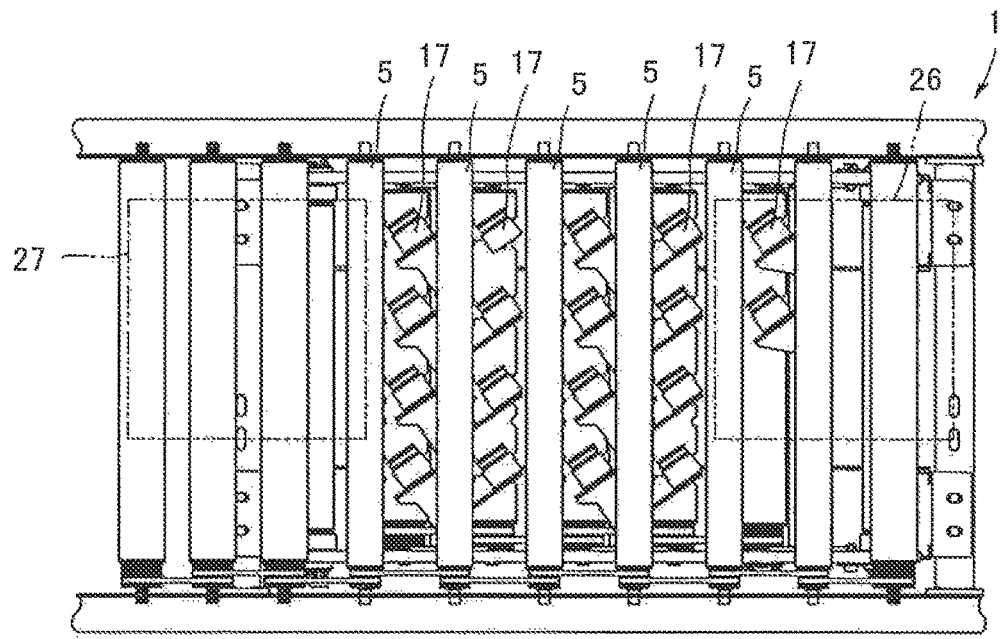
FIG. 15A is a plan view of the conveyor apparatus in FIG. 1, and illustrates a state in which the succeeding conveyed object is moved to the downstream side of the disposed position of the conveyed-object discharge device by the main conveyor, and another succeeding conveyed object is conveyed by the main conveyor to be close to the conveyed-object discharge device.
Figure 15B:
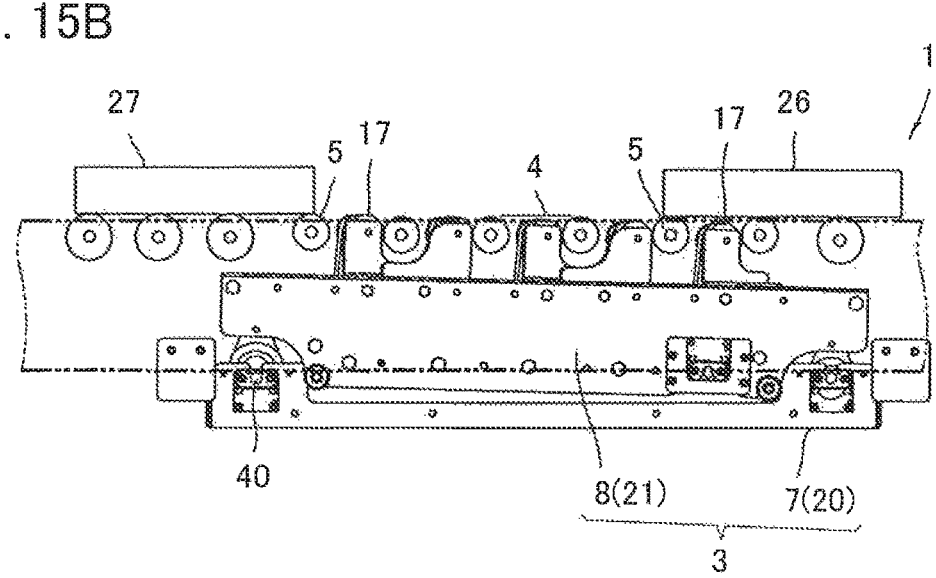
FIG. 15B is a side view of FIG. 15A.

Further, as illustrated in FIG. 15, when another conveyed object 27 is conveyed on the main conveying conveyor 2 following the conveyed object 26, and the conveyance destination for the conveyed object 27 is in the discharge direction, the control device, not illustrated, drives the raising and lowering motor-incorporating roller 40 on the upstream side, and swings the base portion 8 to extend the discharge members 9 (short rollers 17) upwardly of the conveying plane 4. At this time, the discharge members 9 (short rollers 17) on the downstream side retract downwardly from the conveying plane 4, so that the conveyance of the conveyed object 26 along the main conveying conveyor 2 is satisfactorily continued.

Then, when the conveyed object 26 passes through the discharge members 9 (short rollers 17) on the downstream side, the control device, not illustrated, raises the discharge members 9 (short rollers 17) on the downstream side upwardly from the conveying plane 4.

The same operation is repeated.

In the described embodiment, the discharge members 9 side is changed the posture, and the raising and lowering mechanism 12 is mounted to the base member 8 supporting the discharge members 9.

However, since the extension and retraction of the discharge members 9 between the conveying bodies (rollers 5) are relative, the conveying bodies (rollers 5) side may be changed the posture to extend and retract the discharge members 9 between the conveying bodies (rollers 5). In this case, the main conveying conveyor 2 side is the base member, and the raising and lowering mechanism 12 is mounted to the main conveying conveyor 2 to swing the main conveying conveyor 2.

In the described embodiment, the raising and lowering mechanism 12 includes the two raising and lowering motor-incorporating rollers 40, 41, so that one end of the base member 8 is raised and lowered by one raising and lowering motor-incorporating roller 40, and the other end of the base member 8 is raised and lowered by the other raising and lowering motor-incorporating roller 41, thereby raising and lowering and swinging the base member.

In place of this, the mechanism that raises and lowers the base member and the mechanism that swings the base member may be separately provided.

For example, the base member may be swung about a pin, and may be swung by a base member-swinging motor.

In addition, the base member may be raiseable and lowerable along the guides, and raising and lowering motors may be separately provided to raise and lower the base member.

EXPLANATION OF REFERENCE SIGNS

2: Main conveyor (main conveying conveyor)
3: Conveyed-object discharge device
5: Roller (conveying body)
8: Base member
9: Discharge member
10: Short-roller driving roller (rotator)
11: Belt
12: Raising and lowering mechanism (base swinging unit)
15: Main conveying passage
17: Short roller
18a to 18d: Annular groove (pulley) for the short-roller driving roller
25: Preceding conveyed object
40, 41: Raising and lowering motor-incorporating roller
75: Circular projection (conversion unit)
76: Ring (conversion unit)

The invention claimed is:

1. A conveyed-object discharge device for discharging a conveyed object, comprising:
a main conveying conveyer defining part of a main conveying passage, the conveyed object being discharged from the main conveying conveyor,
the main conveying conveyor including a plurality of conveying bodies,
the plurality of conveying bodies coming into contact with the conveyed object to impart a conveying force to the conveyed object,
the plurality of conveying bodies being disposed within a predetermined space;
a plurality of discharge members comprising a first group of discharge members disposed in one region and a second group of discharging members disposed in another region,
the plurality of discharge members extending and retracting between the plurality of conveying bodies,
the plurality of discharge members coming into contact with the conveyed object when the plurality of discharge members extend between the conveying bodies,
the plurality of discharge members actively driven by a driving source and thereby imparting a conveying force to the conveyed object, the conveying force being in a direction different from that of the conveying force imparted by the conveying bodies;
a base member supporting the plurality of discharge members; and
a posture changing unit changing a posture of the base member,
wherein the conveying bodies are rollers, and
wherein at least one of the discharge members includes a support member having two rollers, the two support member rollers having one of the conveying bodies therebetween.

2. The conveyed-object discharge device according to claim 1, wherein the posture changing unit changes the posture of the base member into a tilted posture.

3. The conveyed-object discharge device according to claim 1, wherein the support member rollers are rotated by power, the support member rollers being disposed so as to be tilted with respect to the conveyance direction of the main conveying conveyor.

4. The conveyed-object discharge device according to claim 3, wherein one of the support member rollers disposed on an outer edge side of a discharge trajectory has a higher rotational speed than a rotational speed of one of the support member rollers disposed on an inner edge side of the discharge trajectory, the discharge trajectory being formed when the conveyed object is discharged.

5. The conveyed-object discharge device according to claim 3,
wherein the driving source comprises a rotator, and a plurality of pulleys provided on the rotator, and
wherein a belt is wound between each of a plurality of the support member rollers and a corresponding one of the plurality of pulleys to rotate the plurality of the support member rollers by the rotator.

6. The conveyed-object discharge device according to claim 5,
wherein the rotator is a motor-incorporating roller that incorporates a motor in a roller body, and
wherein the pulleys are annular grooves formed on an outer periphery of the roller body.

7. The conveyed-object discharge device according to claim 6, wherein the annular grooves have different depths, and the annular groove corresponding to one of the support member rollers disposed on an outer edge side of a discharge trajectory has a shallower depth than a depth of an annular groove corresponding to one of the support member rollers disposed on an inner edge side of the discharge trajectory, the discharge trajectory being formed when the conveyed object is discharged.

8. The conveyed-object discharge device according to claim 1, wherein the conveyed-object discharge device comprises a follower member that moves together with the posture change of the base member, and a guide member that comes into contact with the follower member when the follower member moves.

9. The conveyed-object discharge device according to claim 1, wherein the conveyed-object discharge device comprises upstream side discharge members disposed on the upstream side in the flow direction of the main conveying passage, and downstream side discharge members disposed on a downstream side in the flow direction of the main conveying passage, and the upstream side discharge members and the downstream side discharge members can take the following postures:
(1) a posture in which the upstream side discharge members and the downstream side discharge members extend between the conveying bodies;
(2) a posture in which the upstream side discharge members and the downstream side discharge members retract between the conveying bodies;
(3) a posture in which the upstream side discharge members extend between the conveying bodies, and the downstream side discharge members retract between the conveying bodies; and
(4) a posture in which the upstream side discharge members retract between the conveying bodies, and the downstream side discharge members extend between the conveying bodies.

* * * * *